(12) United States Patent
Baghel et al.

(10) Patent No.: US 9,918,324 B2
(45) Date of Patent: Mar. 13, 2018

(54) METHOD AND SYSTEM FOR DELIVERING SYSTEM INFORMATION TO USER EQUIPMENT IN REGION OF CO-CHANNEL INTERFERENCE

(71) Applicant: Samsung Electronics Co., Ltd., Suwon-si, Gyeonggi-do (KR)

(72) Inventors: Sudhir Kumar Baghel, Bangalor (IN); Mangesh Abhimanyu Ingale, Bangalor (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 14/414,807

(22) PCT Filed: Jul. 19, 2013

(86) PCT No.: PCT/KR2013/006503
§ 371 (c)(1),
(2) Date: Jan. 14, 2015

(87) PCT Pub. No.: WO2014/014317
PCT Pub. Date: Jan. 23, 2014

(65) Prior Publication Data
US 2015/0173089 A1 Jun. 18, 2015

(30) Foreign Application Priority Data

| Jul. 19, 2012 | (IN) | 2939/CHE/2012 |
| Sep. 25, 2012 | (IN) | 3986/CHE/2012 |
| Jul. 17, 2013 | (IN) | 2939/CHE/2012 |

(51) Int. Cl.
*H04W 72/08* (2009.01)
*H04W 48/12* (2009.01)
(Continued)

(52) U.S. Cl.
CPC ............ *H04W 72/082* (2013.01); *H04W 4/22* (2013.01); *H04W 48/12* (2013.01); *H04W 72/1226* (2013.01)

(58) Field of Classification Search
CPC ...... H04W 72/082; H04W 4/22; H04W 48/12; H04W 72/1226
See application file for complete search history.

(56) References Cited

U.S. PATENT DOCUMENTS

| 2010/0172325 A1 | 7/2010 | Jung et al. |
| 2011/0002320 A1 | 1/2011 | Yuk et al. |
| (Continued) | | |

FOREIGN PATENT DOCUMENTS

WO 2012/086945 A2 6/2012

*Primary Examiner* — Jackie Zuniga Abad
(74) *Attorney, Agent, or Firm* — Jefferson IP Law, LLP

(57) ABSTRACT

A method and system to deliver updated system information to one or more victim User Equipments (UEs) in connected mode within the dominant co-channel interference region in Heterogeneous Network (HetNet) environment is disclosed. The method enables the base station of a victim cell to trigger one or more victim UEs in the region of co-channel interference to apply a new signaling procedure for acquiring a new message block to be delivered by the victim cell. The method provides an error handling procedure for system information acquisition failure by the victim UE in the dominant co-channel interference region of the victim cell in HetNet. The method improves reliability of updated system information delivery and improves probability of system information acquisition in region of dominant co-channel interference.

18 Claims, 4 Drawing Sheets

(51) Int. Cl.
*H04W 4/22* (2009.01)
*H04W 72/12* (2009.01)

(56) References Cited

U.S. PATENT DOCUMENTS

| | | |
|---|---|---|
| 2012/0113812 A1 | 5/2012 | Ji et al. |
| 2012/0122440 A1 | 5/2012 | Krishnamurthy et al. |
| 2013/0084910 A1* | 4/2013 | Suzuki .................. H04W 24/02 |
| | | 455/515 |

* cited by examiner

[Fig. 1]
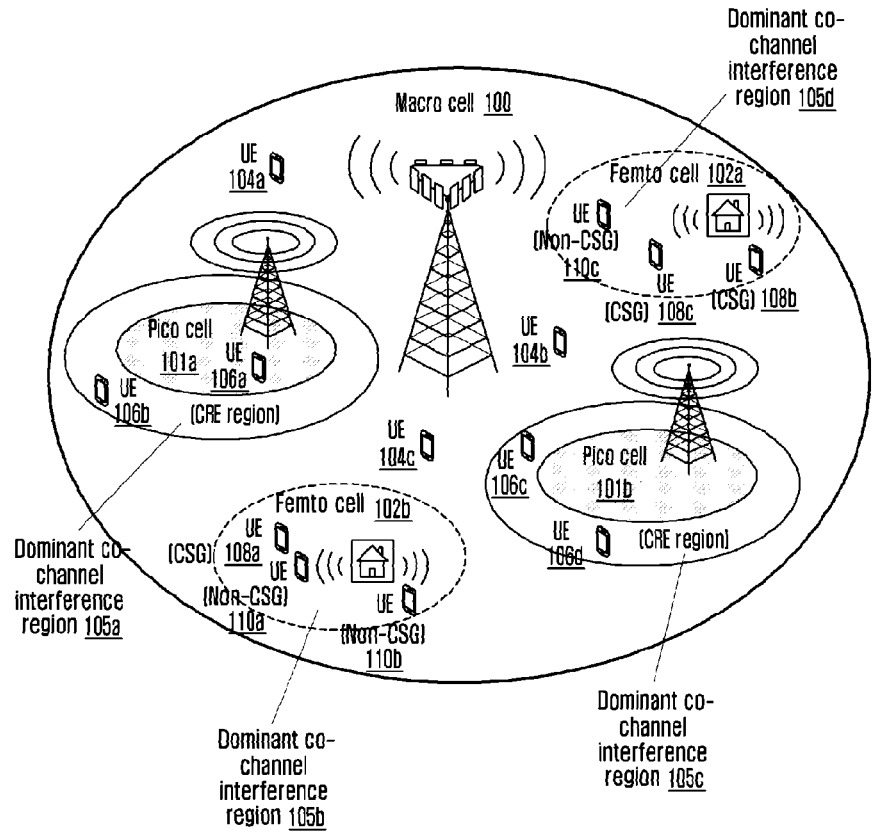
[Fig. 2]
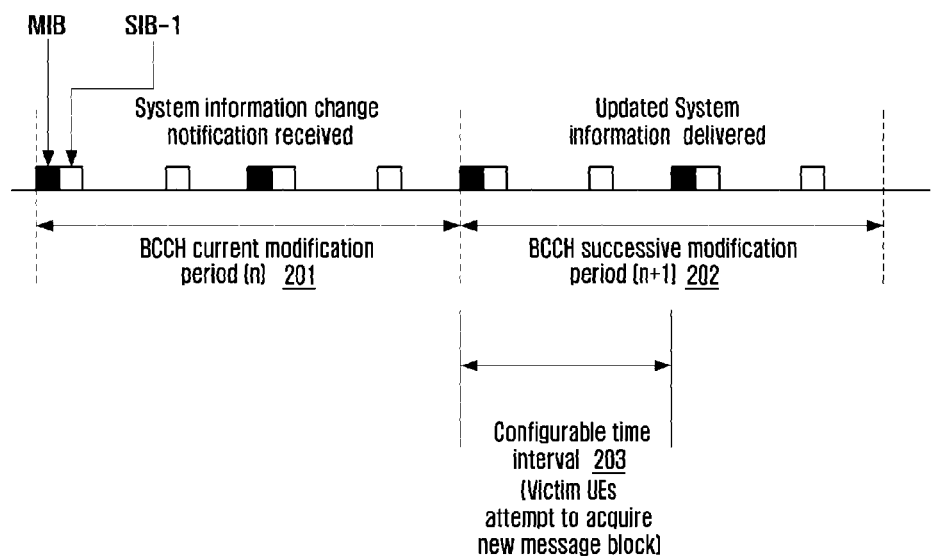

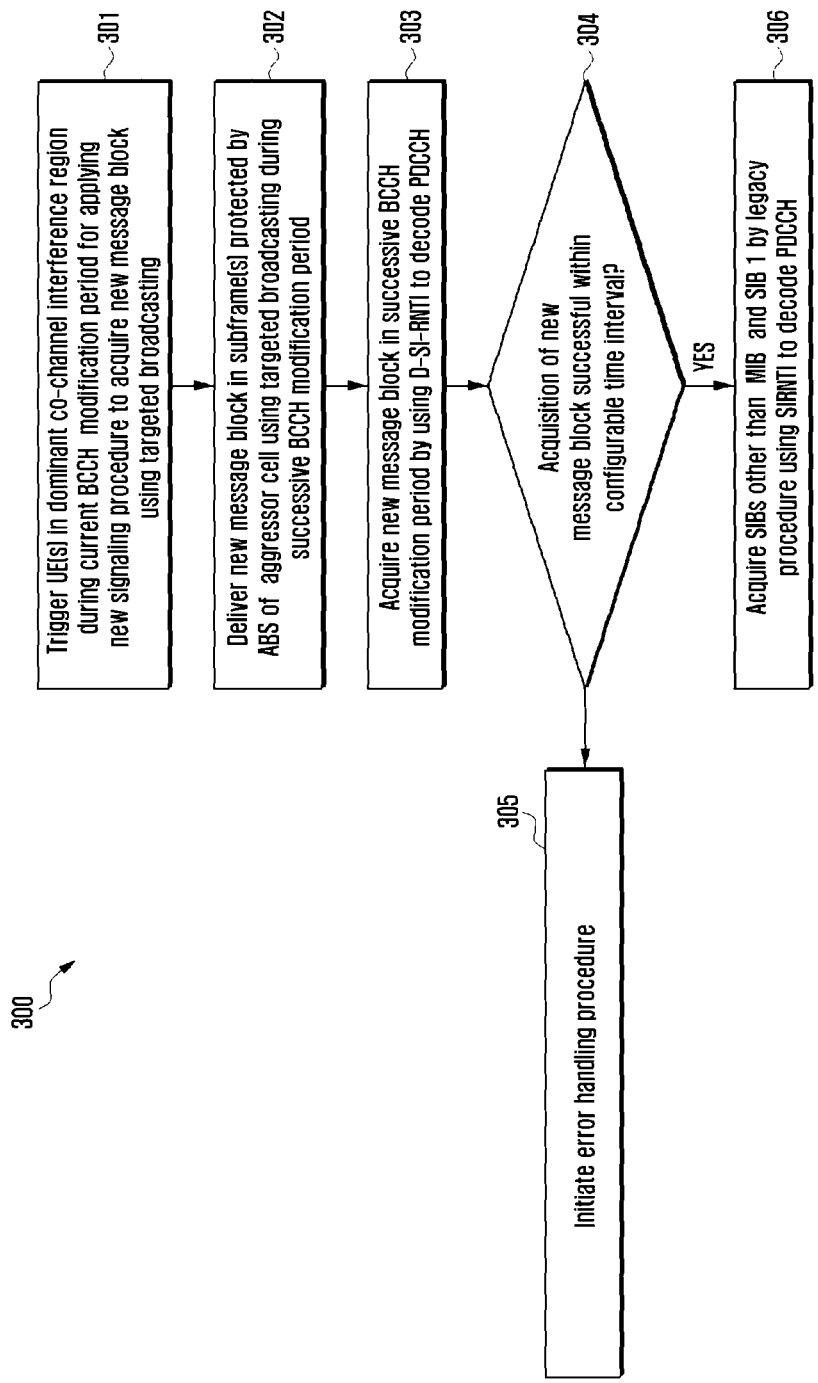
[Fig. 3]

[Fig. 4]
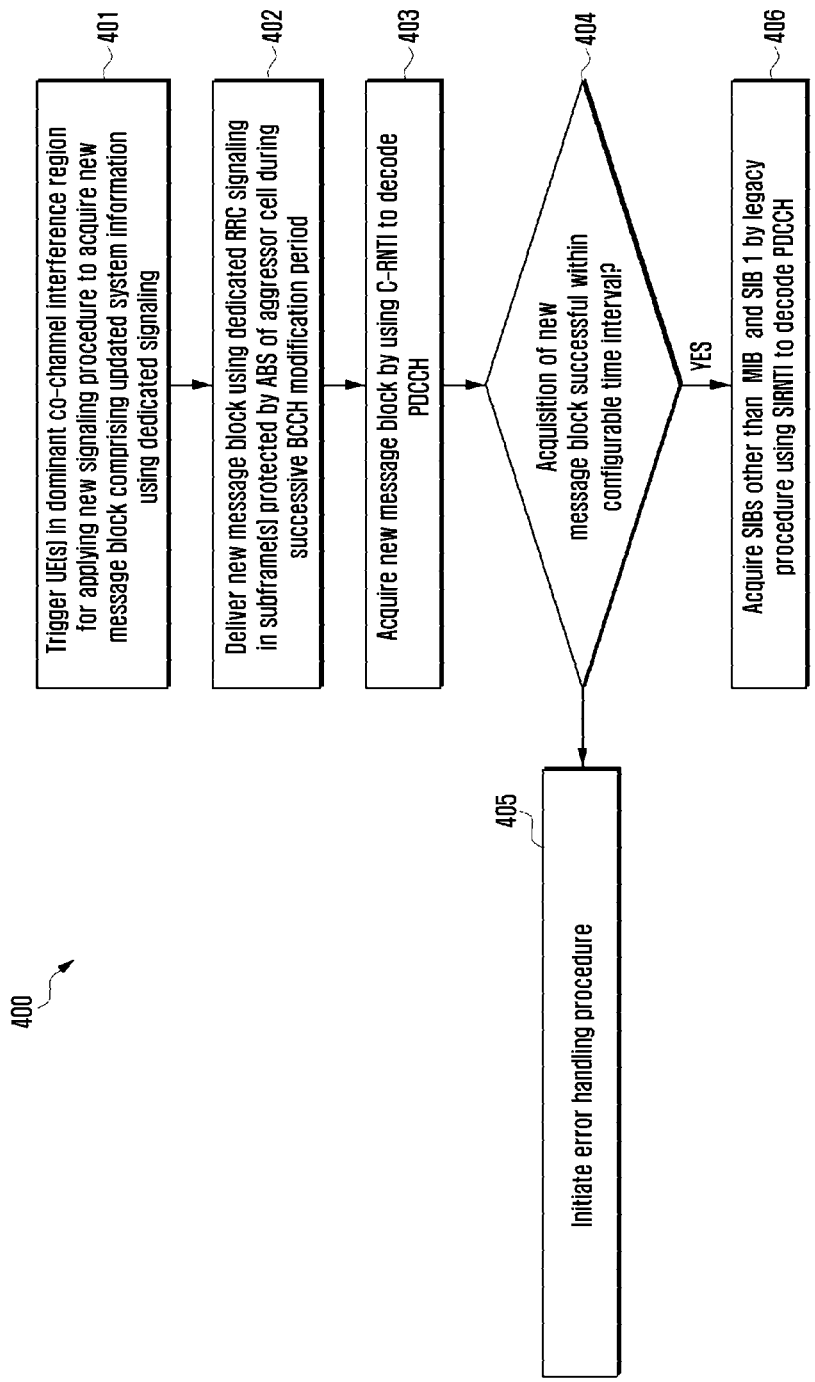

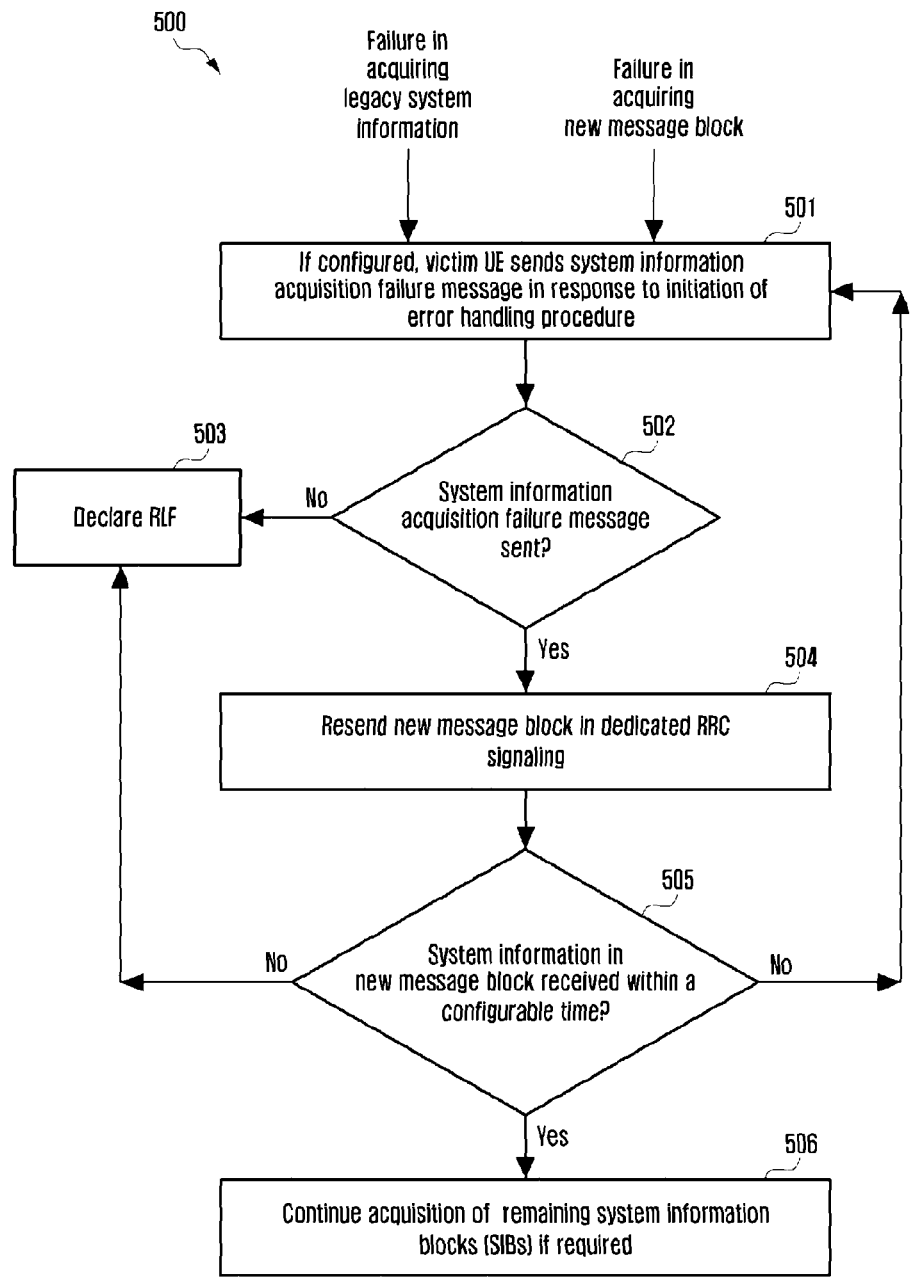
[Fig. 5]

METHOD AND SYSTEM FOR DELIVERING SYSTEM INFORMATION TO USER EQUIPMENT IN REGION OF CO-CHANNEL INTERFERENCE

TECHNICAL FIELD

The present invention relates to wireless communication and more particularly relates to delivery of system information to User Equipments (UEs) in Cell Range Expansion (CRE) region of a co-channel heterogeneous network (HetNet) environment. The present application is based on, and claims priority from, both the Indian Application Number, 2939/CHE/2012 filed on 19 Jul. 2012 and 3986/CHE/2012 filed on 25 Sep. 2012, the disclosure of which is hereby incorporated by reference herein.

BACKGROUND ART

With Long Term Evolution (LTE) networks being widely deployed, the next performance leap is offered by LTE advanced (LTE-A) networks. The LTE advanced networks use heterogeneous network (HetNet) topology capable of providing higher spectral efficiency per unit area. The HetNet has plurality of network nodes includes macro cell (s), pico cell (s), femto cell (s) and relay base stations which enable flexible and low cost deployment. The HetNet enables a network operator to provide a uniform broadband experience or Quality of Service (QoS) to users anywhere in the LTE advanced network by offloading the users from high power network nodes such as macro cell to low power network nodes such as the pico cell or the femto cell.

These low power network nodes are either served on different carrier frequency or a single carrier frequency. In the co-channel HetNet deployment, all low power network nodes share the same carrier frequency as used by the high power network nodes i.e. macro cell(s). The User Equipments (UEs) within the coverage of one cell experience dominant interference from another overlapping and/or adjacent cell. Such an interference scenario is termed as dominant co-channel interference. The cell in which the UE experiences dominant co-channel interference on the served carrier frequency from a nearby cell is called a victim cell and the adjacent or overlapping cell causing the dominant co-channel interference is called an aggressor cell. The co-channel interference is significant when the UE in connected mode falls within region of inter-cell interference of the victim cell, as the UE experiences lower than usual Signal to Interference plus Noise Ratio (SINR). One or more UEs experiencing dominant co-channel interference in the inter-cell region are called victim UEs. Typically, in the HetNet environment primarily comprising macro cells providing coverage and pico cells overlaid on the macro coverage for offloading purpose on the same carrier frequency, the region of inter-cell interference is pre-dominantly the cell range expansion (CRE) region of pico cells. In such a scenario the aggressor cells are high power macros and the victim cells are low power pico cells.

Similarly, in the HetNet environment primarily comprising macro cells providing coverage and femto cells deployed in residential or enterprise locations providing closed subscriber group (CSG) members radio access on the same carrier frequency, the region of inter-cell interference is pre-dominantly the coverage of the femto cell for a non CSG member. In such a scenario for the non-CSG member UE the aggressor cell is low power femto and the victim is high power macro.

Inter-cell Interference Co-ordination (ICIC) for data channel protection in co-channel HetNet provides mechanism to handle inter-cell interference for connected mode UEs within the CRE region. The ICIC is handled through Time Division Multiplex (TDM) approach based on Almost Blank Subframe (ABS) based on Third Generation Partnership Project (3GPP) Release 10 LTE-Advanced specification. Subframes with reduced power on some physical channels and/or reduced activity are characterized as ABS. Typically, the aggressor cell employs ABS such that the data channel scheduled to the victim UE by the victim cell is protected during ABS. Hence, the victim UE does not experience interference from the dominant interferer cell during ABS. According to 3GPP Release 10 LTE-Advanced specification, when TDM ICIC is implemented by means of ABS, the serving cells derive UE specific measurement resource restriction patterns based on the ABS and configure them to the respective victim UEs. The configured victim UEs perform restricted measurements, specific to subframes that are identified based on the configured measurement resource restriction patterns.

In connected mode, the UE is supposed to maintain up-to-date system information (SI) comprising the Master Information Block (MIB), type one System Information Block (SIB-1) and type two System Information Block (SIB-2). According to the 3GPP specification, whenever the system information changes the UEs are notified through a paging message. According to 3GPP specification TS 36.331, UE acquires the required system information from the beginning of the successive Broadcast Control Channel (BCCH) modification period following the current BCCH modification period in which the system information change notification was received. The system information to be acquired is the legacy MIB and/or the legacy SIB-1. Then, depending on the systemInfoValueTagfield in the legacySIB-1, the UE decides which other SIBs the UE has to acquire.

However, the legacy MIB transmission is fixed in time and frequency. The legacy SIB-1 transmission is fixed in time, which is at fifth subframe with a periodicity of 80 milliseconds. The location of legacy SIB-1 in frequency domain is not fixed and is addressed by Physical Downlink Control Channel (PDCCH) in common search space which is decoded by the UE using System Information Radio Network Temporary Identifier (SI-RNTI). However, the victim UE in the dominant co-channel interference region with Primary broadcast channel (PBCH) Interference Cancellation (IC) capability may successfully acquire legacy MIB; otherwise fail to acquire the legacy MIB if it does not have PBCH IC capability. However, the victim UE may fail to acquire SIB-1 unless the transmitted SIB-1 coincides with the ABS of the aggressor cell.

Existing methods fail to provide mechanisms to ensure acquisition of system information by the victim UE in the dominant co-channel interference region of the victim cell and hamper the system information reception reliability of the victim UEs.

DISCLOSURE OF INVENTION

Technical Problem

The principal object of the embodiments herein is to provide a method and system for delivering system information to the victim User Equipment (UE) in connected mode within the dominant co-channel interference region of a victim cell in a Heterogeneous Network (HetNet) environment.

Another object of the invention is to provide a method for handling system information acquisition failure by the victim UE in the dominant co-channel interference region of the victim cell in the HetNet.

Solution to Problem

Accordingly the invention provides a method for delivering system information to at least one User Equipment (UE) in connected mode within a dominant co-channel interference region of a victim cell in a Heterogeneous Network (HetNet) environment, wherein the method comprises triggering at least one UE during current Broadcast Control Channel (BCCH) modification period to apply a new signaling procedure for acquiring updated system information. Further the method comprises delivering the updated system information in a new message block within a subframe protected by Almost Blank Subframe (ABS) of an aggressor cell.

Accordingly the invention provides a User Equipment (UE) for receiving system information within a dominant co-channel interference region of a victim cell in a Heterogeneous Network (HetNet) environment, wherein the UE comprises an integrated circuit. Further the integrated circuit comprises at least one processor and at least one memory. The memory comprises a computer program code within the integrated circuit and at least one memory. The computer program code with the at least one processor cause the UE to receive a trigger during current Broadcast Control Channel (BCCH) modification period to apply a new signaling procedure for acquiring updated system information. Further the UE is configured to update system information which is delivered in a new message block within a subframe protected by Almost Blank Subframe (ABS) of an aggressor cell.

Accordingly the invention provides a Heterogeneous Network (HetNet) for delivering system information to at least one User Equipment (UE) in connected mode within a dominant co-channel interference region of a victim cell, wherein the HetNet comprises at least one of: one or more macro cell(s), one or more pico cell(s), one or more femto cell(s). Further the network is configured to trigger the at least one UE during current Broadcast Control Channel (BCCH) modification period to apply a new signaling procedure for acquiring updated system information. Further the network is configured to deliver the updated system information in a new message block within a subframe protected by Almost Blank Subframe (ABS) of an aggressor cell, wherein the aggressor cell comprises either at least one macro cell or at least one femto cell.

Advantageous Effects of Invention

The method enables the base station of a victim cell to trigger one or more victim UEs in the region of co-channel interference to apply a new signaling procedure for acquiring a new message block to be delivered by the victim cell. The method provides an error handling procedure for system information acquisition failure by the victim UE in the dominant co-channel interference region of the victim cell in HetNet. The method improves reliability of updated system information delivery and improves probability of system information acquisition in region of dominant co-channel interference.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 illustrates an example co-channel Heterogeneous Network (HetNet) environment with one or more macro cell(s), one or more pico cell(s) and one or more femto cell(s) sharing the same carrier frequency and serving one or more User Equipments (UEs), according to embodiments as disclosed herein;

FIG. 2 illustrates a normal BCCH modification period cycle with a configurable time interval during which one or more victim UEs attempt acquiring a new message block, according to embodiments as disclosed herein;

FIG. 3 illustrates a flow diagram explaining targeted broadcasting mode of transmission for delivery of the new message block to one or more victim UEs in the dominant co-channel interference region, according to embodiments as disclosed herein;

FIG. 4 illustrates a flow diagram explaining dedicated signaling mode of transmission for delivery of the new message block to one or more victim UEs in the dominant co-channel interference region, according to embodiments as disclosed herein; and FIG. 5 illustrates a flow diagram explaining error handling procedure for failure in acquisition of system information according to embodiments as disclosed herein.

MODE FOR THE INVENTION

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system to deliver updated system information to one or more victim User Equipments (UEs) in connected mode within the dominant co-channel interference region in the co-channel Heterogeneous Network (HetNet) environment. The method disclosed enables the base station of a victim cell to trigger one or more victim UEs in the dominant co-channel interference region to apply a new signaling procedure for acquiring a new message block to be delivered by the victim cell.

In accordance to Rel-10 eICIC the configuration of measurement resource restriction pattern(s) to victim UEs is handled in a network implementation specific way. There is no direct information from the UE to the network indicating that it is a victim UE. Similarly network can identify the victim UE for provisioning a new message block comprising system information update. The network specific implementation for provisioning a new message block could be based on the measurement reports such as Reference Symbol Received Power (RSRP) or Reference Symbol Received Quality RSRQ measurements sent by the UE. Alternatively, it could be based on the Channel Quality Indications (CQI) feedbacks sent by the UE to the network or it could be based on the combined information from measurement reports and CQI feedback.

In an embodiment, one or more victim UEs can be triggered explicitly or implicitly through one or more triggering mechanisms by the victim cell to start acquiring system information update through new signaling procedure.

One or more victim UEs in the dominant co-channel interference region can be explicitly triggered for applying new signaling procedure to acquire updated system information by sending system information acquisition indication to one or more victim UEs using a paging UE Identity field in a paging message, a cell specific broadcast indication or the indication through UE specific Radio Resource Control (RRC) dedicated signaling. One or more victim UEs in the dominant co-channel interference region can be implicitly triggered for applying new signaling procedure to acquire updated system information when these one or more victim UEs are configured with one or more measurement resource restriction pattern by the victim cell, where the measurement resource restriction pattern can be a serving cell restriction pattern (pattern 1).

The method disclosed enables the base station of the victim cell to deliver the updated system information in a new message block to one or more victim UEs in the dominant co-channel interference region protected by Almost Blank Subframe (ABS) of the aggressor cell.

In an embodiment, the new message block is delivered through targeted broadcasting and is acquired by one or more victim UEs using a new Dedicated System Information Radio Network Temporary Identifier (D-SI-RNTI) to decode the Physical Downlink Control Channel (PDCCH) which addresses the new message block.

In an embodiment, the new message block is delivered through dedicated Radio Resource Control (RRC) signaling (UE specific dedicated signaling) and is acquired by one or more victim UEs using a Cell Radio Network Temporary Identifier (C-RNTI) allocated to the victim UE.

The new message block comprises system information such as a new Master information Block (new MIB), a new type one System Information Block (new SIB-1) and the like. The information in the new message block is similar to legacy system information such as a legacy MIB and a legacy SIB-1 but transmitted at a location in time domain different from location of the legacy MIB and legacy SIB-1. The location in time domain for the new message block overlaps with the ABS of the aggressor cell and thus enables reliable acquisition of system information in the dominant co-channel interference region.

In an embodiment, if the victim UE is equipped with Primary broadcast channel (PBCH) interference cancellation capability to acquire the legacy MIB, then the updated system information delivered in the new message block comprises new SIB-1.

The new signaling procedure enables one or more victim UEs to attempt acquiring the new message block within a configurable time interval of one or more successive Broadcast Control Channel (BCCH) modification period, if one or more victim UEs receive the trigger indication for acquiring the new message block during the current BCCH modification period. The configurable time interval is specified with reference to start boundary of a BCCH modification period.

In an embodiment, the configurable time interval after the modification period boundary can be hardcoded in the UE, where victim UE expects delivery of new message block either in targeted broadcasting mode or dedicated transmission mode. Alternatively, the configurable time interval can be explicitly signaled to the victim UE present in the dominant co-channel interference region.

The method disclosed enables one or more victim UEs to initiate an error handling procedure either by declaring Radio Link Failure (RLF) or initiating system information acquisition failure message to the victim cell, if any of the victim UEs fail to acquire the new message block and/or legacy system information within the configurable time interval or within a pre-defined new error handling timer. Upon receiving the system information acquisition failure message, the victim cell resends the new message block in a dedicated RRC signaling.

In an embodiment, on failure of acquisition of system information comprising legacy system information and/or new message block, one or more UEs send a dedicated system information acquisition failure message to the victim cell using either a RRC dedicated message or a Medium Access Control (MAC) Control Element (MAC CE) or the like. The victim cell resends the new message in a dedicated RRC signaling upon reception of said failure message from victim UE.

In an embodiment, the method enables one or more victim UEs to initiate request to the victim cell for provision of system information update using dedicated signaling transmission mode if one or more victim UEs receive said system information change indication in a paging message, after handover to a target cell, on reception of Earthquake and Tsunami Warning System (ETWS) notification and Commercial Mobile Alert System (CMAS) notification.

After delivering the new message block protected by the ABS of aggressor cell and upon successfully acquiring the updated system information by one or more victim UEs, the victim UEs resume the legacy system acquisition procedure for acquiring one or more SIBs other than said new SIB-1 such as SIB-2, SIB-3 and the like, if needed based on systemInfoValueTag field in the acquired new SIB-1.

In an embodiment, the method provides a new notification indicating one or more victim UEs specifying that the system information change is not relevant for the connected mode UEs. The new notification can be associated with system information change indication in paging message to inform one or more victim UEs to ignore acquisition of system information update or initiation of the error handling procedure on failure of acquisition of the updated system information. The new notification indicates system information change is not relevant for connected mode. Thus, not only saving battery power consumption by avoiding unnecessary system information acquisitions but also improving system efficiency by avoiding provisioning of duplicate system information and avoiding error handling procedure.

Throughout the description, the proposed method is described with reference to a Macro-Pico HetNetdeployment scenario. However, the embodiments of the method are also applicable to a Macro-Femto HetNet deployment scenario.

Referring now to the drawings, and more particularly to FIGS. 1 through 5, where similar reference characters denote corresponding features consistently throughout the figures, there are shown preferred embodiments.

FIG. 1 illustrates an example co-channel Heterogeneous Network (HetNet) environment with one or more macro cell(s), one or more pico cell(s) and one or more femto cell(s) sharing the same carrier frequency and serving one or more UEs, according to embodiments as disclosed herein. The figure depicts a macro cell 100, a pico cell 101a and 101b respectively, a femto cell 102a and 102b respectively, dominant co-channel interference regions 105a, 105b 105c and 105d in the co-channel HetNet deployment. Plurality of UEs are spread across the macro cell 100 with one or more UEs 104a, 104b, and 104c and soon served by the macro cell. The pico cell 101a and the pico cell 101b serving one or more UEs 106a, 106b, 106c, 106d and so on and the femto cell 102a and the femto cell 102b serving one or more member UEs termed as CSG UEs 108a, 108b, 108c and so on. One or more non-member UEs within the femto coverage of 102a and 102b are termed as non CSG UEs 110a, 110b, 110c and so on. The non-CSG UEs 110a, 110b, 110c are served by the macro cell 100.

In the macro-pico scenario, the macro cell 100 is the aggressor cell and the pico cell 101a or the pico cell 101b is the victim cell. One or more pico UEs 106b, 106c and 106d in the Cell Range Expansion (CRE) region of pico cell experience dominant co-channel interference from transmissions of macro cell (aggressor cell) are the victim UEs. Thus, in macro-pico scenario the CRE region is the region of dominant co-channel interference. In FIG. 1, such inter-cell interference region corresponds to 105a and 105c which are pico CRE regions. In the macro-femto scenario, the non-member UEs 110a, 110b and 110c which do not have access to a closed femto cell 102a and 102b, also called non Closed Subscriber Group (CSG) UEs are served by base station of the macro cell even if these non CSG UEs enter the range of femto cell 102a and 102b. However, the member UEs such as. CSG UEs 108a, 108b and 108c have access to femto cell 102a and 102b and are served by their respective femto cell. Thus, as the non CSG UEs 110a and 110b approach closer to the vicinity of femto cell's 102b base station they experience dominant co-channel interference from the femto cell 102b in the dominant co-channel interference region 105b which is the coverage of the femto cell 102b. Likewise non CSG UE 110c experience high interference from femto cell 102a in the dominant co-channel interference region 105d. Thus, the macro cell is the victim cell where the non CSG UEs 110a, 110b, 100c are the victim UEs experiencing interference from transmissions of base station of the femto (aggressor) cell 102a and 102b. The one or more victim UEs in the dominant co-channel interference region 105a, 105b, 105c and 105d respectively are configured with one or more measurement resource restriction pattern by the victim cell, where the measurement resource restriction pattern can be a serving cell restriction pattern (pattern 1). The configuration of measurement resource restriction pattern is in accordance with the Third Generation Partnership Project (3GPP) Release 10 LTE-A specification that addresses Time Division Multiplexing (TDM) Inter-cell Interference Co-ordination (ICIC).

One or more victim UEs within the dominant co-channel interference region 105a, 105b,105c and 105d respectively are unable to acquire SIB-1 that is broadcasted at regular intervals in every Broadcast Channel (BCCH) modification period. Since the legacy system information (legacy MIB and/or legacy SIB-1) reception reliability is unsure for victim UEs in the dominant co-channel interference region 105a, 105b, 105 band 105d respectively, the method provides a new signaling procedure to be selectively applied for one or more victim UEs. For example, one or more victim UEs in the dominant co-channel interference region 105a and 105c (CRE region) of pico cells 102a and pico cell 102b respectively. The method triggers one or more victim UEs in the dominant co-channel interference region 105a, 105b, 105c and 105d using explicit or implicit triggering indication to acquire the updated system information delivered in the new message block by applying the new signaling procedure.

The selective triggering provided by the method enables other UEs not within the dominant co-channel interference region 105a, 105b,105c or 105d to acquire the legacy system information using legacy system information acquisition procedure.

One or more victim UEs, if they leave the dominant co-channel interference region 105a, 105b, 105c or 105d are then de-configured with the measurement resource restriction pattern. The method enables the de-configured UEs to resume legacy system acquisition procedure and continue acquiring legacy system information.

FIG. 2 illustrates the normal BCCH modification period cycle with a configurable time interval during which one or more victim UEs attempt acquiring the new message block, according to embodiments as disclosed herein.

In accordance with the 3GPP specification, during the current BCCH modification period (n) 201 the UE in connected mode monitors the paging message during one of the paging opportunities. If the paging message carries the system information change indication, the UE acquires the changed (updated) system information such as legacy MIB and legacy SIB-1 from the beginning (start boundary) of the successive BCCH modification period (n+1) 202. Further, depending on the systemInfoValueTagfield in the acquired SIB-1, the UE decides which other SIBs to acquire. Alternatively, according to 3GPP specification UE may not monitor the paging message in one of the paging opportunities during modification period (n) 201, but regularly verifies that whether stored system information is valid by checking systemInfoValueTagfield by acquiring legacy SIB-1 after the modification period boundary i.e. during successive BCCH modification period (n+1) 202. However, one or more victim UEs may not be able to check the systemInfoValueTagfield, since these UEs are not able to acquire legacy SIB-1. The transmission of legacy SIB-1 occurs at a fixed time, typically, at $5^{th}$ sub frame at a periodicity of 80 ms. For good reception reliability, the legacy SIB-1 is repeated in alternate radio frames at sub frame #5 as depicted in the figure. However, in the context of co-channel HetNet deployment where the inter-cell interference is dominant, the legacy SIB-1 reception reliability is very low.

As depicted in the figure, the new signaling procedure, disclosed by the method, explicitly or implicitly triggers one or more victim UEs in current BCCH modification period 201 to attempt acquisition of the new message block delivered by the victim cell within the configurable time interval 203 of one or more successive BCCH modification periods.

The new message block comprises the new MIB and/or the new SIB-1 which is delivered to one or more victim UEs through targeted broadcast or UE specific dedicated signaling. The method ensures the new message block is protected by ABS of the aggressor cell.

However, the method enables other non-victim UEs to acquire the legacy system information transmitted by victim cell at sub frame #5 addressed by PDCCH decoding with SI-RNTI.

FIG. 3 illustrates an example flow diagram explaining targeted broadcasting mode of transmission for delivery of the new message block to one or more UEs in the dominant co-channel interference region, according to embodiments as disclosed herein. As depicted in the flow diagram 300, whenever there is a change in system information, at step 301 one or more victim UEs in the dominant co-channel interference regions 105a and 105b (CRE regions in the macro-pico HetNet scenario) of the pico cell 101a and pico cell 101b respectively are triggered by respective victim cells during current BCCH modification period 201. The trigger indication received by victim UEs during current modification period 201 indicates one or more victim UEs to apply new signaling procedure for acquiring new message block delivered through targeted broadcasting during the successive BCCH modification period 202. The victim UEs are identified by the victim cell in an implementation specific manner like based on the CQI reports sent by the victim UEs and the like. The victim UEs are configured with one or more measurement resource restriction pattern(s) by the victim cell for Radio Resource Management (RRM) measurements, Radio Rink Monitoring (RLM) measurements and Channel State Information (CSI) measurements. At step 302, the new message block is delivered by the victim cell (such as base station of pico cell 101a) in subframe protected by ABS of aggressor cell (macro cell 100) using targeted broadcasting in the successive BCCH modification period 202. At step 303, on receiving the trigger indication, the new message block is acquired by the victim UE using a new D-SI-RNTI in order to decode Physical Downlink Control Channel (PDCCH) in successive BCCH modification period 202. The location of new message block in the successive BCCH modification period 202 is intimated to the victim UE by the victim cell.

In an embodiment, the D-SI-RNTI can be present in common search space or in dedicated search space. At step 304, a check is performed by the victim UE to confirm successful acquisition of the either the legacy SIB-1 or the new message block within the configurable time interval 203. On failure in acquiring the new message block, at step 305, the error handling procedure is initiated by the victim UE.

If at step 304, the acquisition of either the legacy SIB-1 or the new message block is successful, then at step 306 based on other SIBs scheduling information as specified in SIB-1; other SIBs are acquired if required; by legacy system acquisition procedure using SI-RNTI to decode the PDCCH. The various actions in flow diagram 300 may be performed in the order presented, in a different order or simultaneously. Further, in some embodiments, some actions listed in FIG. 3 may be omitted. One such action is upon reception of the trigger indication in current modification period 201, the victim UE may abort acquisition of legacy SIB-1 in the successive modification period 202.

In an embodiment, the trigger indication for one or more victim UEs to acquire the new message block by applying new signaling procedure is sent in the paging message by the victim cell which carries the system information change indication. The trigger indicator is associated with the Paging UE-Identity field in the paging message. The base station of the victim cell ensures that the indicator is included for only those UEs which are in dominant co-channel interference region (i.e. pico CRE region). Upon reception of the paging message one or more victim UEs who receive the indicator associated with the Paging UE-Identity field may apply the new procedure to acquire SIB-1 in addition to the legacy SIB-1 acquisition procedure. In an embodiment, victim UEs may abort acquisition of legacy SIB-1 in the successive modification period if it received the trigger indication in previous modification period. Other UEs in the HetNet which are not victim UEs follow legacy system acquisition procedure for acquiring system information update.

In an embodiment, the trigger indication for one or more victim UEs to acquire new message block according to new signaling is broadcasted to all UEs within the coverage of victim cell.

In an embodiment, the trigger indication for UEs to acquire new message block according to new signaling is sent in the paging message which carries the system information change notification is applicable to all UEs in the HetNet. In this approach all UEs apply the new procedure to acquire new message block discarding the legacy procedure for acquiring system information.

In an embodiment, UEs which are configured with the serving cell measurement resource restriction pattern (pattern1) and receive the trigger indication during the current modification period acquire the new message block using new signaling procedure.

In an embodiment, one or more victim UEs receives the trigger indication to acquire the new message block. The UEs that associate themselves with the Paging UE-Identity field in the paging message acquire new message block using new signaling procedure.

In an embodiment, one or more victim UEs receive the trigger indication through cell-specific broadcast to acquire new message block using new signaling procedure.

In an embodiment, UEs receives the trigger indication through UE-specific dedicated signaling during the current modification period to acquire new SIB-1 from the beginning of the modification period boundary.

In an embodiment, the UE-specific dedicated RRC message sent in the current BCCH modification period (n) 201 may include the location information of new message block in successive BCCH modification period (n+1) 202 along with the D-SI-RNTI and the time window indicating configurable time interval 203 for using the D-SI-RNTI to decode the PDCCH addressing the new message block and extracting the updated system information.

In an embodiment, when the paging message carries the system information change notification in current BCCH modification period (n) 201, the one or more victim UEs acquire the required system information, from the beginning of the successive BCCH modification period (n+1) 202 which follows the one in which the system information change notification was received in the paging message. UEs not in dominant co-channel interference region (i.e. not in pico CRE region) shall follow the legacy procedure for acquiring system information.

In an embodiment, the UEs which are in pico CRE region abort legacy system acquisition procedure, instead acquire new message block using new signaling procedure.

In an embodiment, the location of new message block can be anywhere after the BCCH modification period start boundary. Thus, the one or more victim UEs in pico CRE region which received the trigger indication to acquire new message block, continue using D-SI-RNTI as long as one or more victim UEs are not able to reliably acquire new message block after the modification period (n) boundary. However the base station (for example, Pico-eNB) of victim cell such as the pico cell 101a broadcasts the new message block protected by ABS of aggressor cell addressed by PDCCH using D-SI-RNTI for certain duration of time after modification period (n) boundary.

In an embodiment, one or more victim UEs which receive the trigger indication to acquire new message block in current BCCH modification period (n) 201 use the D-SI-RNTI to decode PDCCH addressing new message block which is expected anywhere after the modification period (n) boundary.

In an embodiment, one or more victim UEs are aware of the time interval during which the base station of victim cell (for example Pico eNB of pico-cell 101a) broadcasts the new message block addressed by PDCCH using D-SI-RNTI after the current BCCH modification period (n) 201 boundary. Thus, one or more victim UEs now for how long after the current BCCH modification period one or more victim UEs are supposed to use D-SI-RNTI. Once the time interval expires and the new message block comprising SIB-1 update is acquired, if required, one or more victim resume using legacy system acquisition procedure to acquire other SIBs such as SIB-2, SIB-3 and the like.

In an embodiment, the paging message sent in the current BCCH modification period (n) 201 can include the location information of new message block in modification period (n+1) along with the D-SI-RNTI and the time window for using the D-SI-RNTI.

In an embodiment, during the current BCCH modification period (n) 201 itself, the victim cell may send a new UE-specific dedicated RRC messages (using C-RNTI of those UEs) to one or more victim UEs which are in the CRE region of pico cell 101a. This new UE-specific dedicated RRC message contains the trigger indication, the location information of new message block in the successive BCCH modification period (n+1) 202 along with the D-SI-RNTI to decode the PDCCH addressing the new message block. The location information may include the System Frame Number (SFN) number and sub frame number in that SFN or the SFN number and time window after the successive BCCH modification period start boundary, where the victim cell may transmit the new message block.

In an embodiment, the new UE-specific dedicated RRC message sent in current BCCH modification period (n) 201 may include the location information of new message block in the successive BCCH modification period (n+1) 202 along with the D-SI-RNTI and the time window for using the D-SI-RNTI.

In an embodiment, to ensure that the start of the ABS pattern overlaps with start boundary of the BCCH modification period a Modificationperiodmod Measurementsubframepatternlengthis assigned to 0. Thus, one or more victim UEs search for Physical Downlink Shared Channel (PDSCH) at a fixed location that provides the time and frequency with reference to start boundary of the successive BCCH modification period 202 boundary to acquire the new message block. The fixed location can be pre-coded in the LTE-Advanced specification. Thus, the PDSCH carrying the new message block is not addressed by PDCCH, which avoids the usage of D-SI-RNTI.

In an embodiment, the location of new message block is fixed in time and frequency with reference to the start boundary of the BCCH modification period and can be specified in the LTE-Advanced specification such that Modificationperiodmod MeasurementsubframepatternLength=0.

According to TS 36.331, in connected mode UE implementation is not mandated to monitor paging opportunity during the current BCCH modification period (n) 201. Such UE implementations during successive BCCH modification period (n+1) 202, verify that stored system information remains valid by checking systemInfoValueTagfield in legacy SIB-1 after the boundary of current BCCH modification period (n) 201.

In an embodiment, the one or more victim UEs configured with serving cell measurement resource restriction pattern (pattern1) attempt to acquire legacy MIB and legacy SIB-1 according to legacy system acquisition procedure during 80 ms after the boundary of current BCCH modification period (n) 201 to check the systemInfoValueTagfield in legacy SIB-1. If one or more victim UEs are unable to acquire either legacy MIB or legacy SIB-1 during the 80 ms then one or more victim UEs use the D-SI-RNTI to decode the PDCCH addressing the new message block comprising the new MIB and/or the new SIB-1.

In an embodiment, when UEs configured with serving cell measurement resource restriction pattern (victim UEs) fail to receive system information change indication in paging message in current BCCH modification period (n) 201, then one or more victim UEs acquire legacy MIB and legacy SIB-1 during 80 ms after the boundary of current BCCH modification period (n) 201 to check the systemInfoValueTagfield in the legacy SIB-1. If one or more UEs fail to successfully acquire the legacy MIB or the legacy SIB-1 then one or more victim UEs shall apply the new signaling procedure to acquire new MIB and new SIB-1 (the new message block).

In an embodiment, the PDCCH decoding using D-SI-RNTI occurs in the common search space of PDCCH.

In an embodiment, the PDCCH decoding using D-SI-RNTI occurs in the dedicated search space of PDCCH. One or more victim UEs in pico CRE are allowed to use their own C-RNTI and D-SI-RNTI simultaneously for PDCCH decoding in the dedicated search space.

In an embodiment, if the victim UE is using D-SI-RNTI for PDCCH decoding in dedicated search space then the victim cell ensures that Downlink (DL) assignment is not scheduled on PDSCH for the victim UE so that simultaneous usage of C-RNTI and D-SI-RNTI is avoided.

In an embodiment, one or more victim UEs in pico CRE region who receive indication to acquire new message block can first use legacy system acquisition procedure applying SI-RNTI to decode PDCCH addressing legacy system information. If the victim UE fails to acquire the legacy system information, the victim UE attempts to use new D-SI-RNTI to decode PDCCH addressing the new message block transmitted in sub frame protected by ABS of the aggressor cell (i.e. macro cell 100).

Even though the victim cell is broadcasting new message block addressed by PDCCH using D-SI-RNTI in sub frame protected by ABS of aggressor cell, there is possibility of PDCCH interference in the victim cell from the PDCCH in the aggressor cell. The aggressor cell may transmit PDCCH in the ABS addressing the legacy control signaling like paging, SIBs and so on.

In an embodiment, when the aggressor cell and victim cell negotiate the ABS pattern on the X2 interface, the aggressor cells indicates the ABS sub frame where it is unlikely to transmit legacy control signaling like paging, SIBs and so on. The victim cell therefore has knowledge about the ABS sub frames where the PDCCH addressing the new message block may not encounter PDCCH interference from the aggressor cell.

In an embodiment, the system information (new message block) may be delivered by victim cell in ABS protected subframe using the enhanced PDCCH (ePDCCH).

FIG. 4 illustrates an example flow diagram explaining dedicated signaling mode of transmission for delivery of the new message block to one or more UEs in the CRE region, according to embodiments as disclosed herein. As depicted in FIG. 400, whenever there is a change in system information, at step 401 one or more victim UEs in the dominant co-channel interference region 105a and 105b (pico CRE regions) of the pico cell 101a and the pico cell 101b are triggered by respective victim cells during current BCCH modification period (n) 201. At step 402, the new message block is delivered by the victim cell (such as base station of pico cell 101a) in subframe protected by ABS of the aggressor cell (macro cell 100) using dedicated RRC signaling. At step 403, on receiving the trigger indication, the new message block is acquired by the victim UE using the victim UEs C-RNTI. Optionally, victim UE may try to acquire legacy SIB-1 using S-RNTI. At step 404, a check is performed by the victim UE to confirm successful acquisition of either the legacy SIB-1 or the new message block within the configurable time interval 203. On failure in acquiring either the legacy SIB-1 or the new message block, at step 405, the error handling procedure is initiated by the victim UE. If at step 404, the acquisition of either the legacy SIB-1 or the new message block is successful, then at step 406 based on other SIBs scheduling information as specified in SIB-1; other SIBs are acquired, if required; by legacy system acquisition procedure using SI-RNTI to decode PDCCH. The various actions in flow diagram 400 may be performed in the order presented, in a different order or simultaneously. Further, in some embodiments, some actions listed in FIG. 4 may be omitted.

In an embodiment, upon reception of the trigger indication in current modification period 201, the victim UE may abort acquisition of legacy SIB-1 in the successive modification period 202.

In an embodiment, the delivery of new message block delivered through dedicated RRC signaling comprises initiating acquisition of legacy system information by applying the legacy system acquisition procedure using SI-RNTI by the victim UE on receiving a system information change indication in paging message. Further, the new message block is also received through the dedicated RRC signaling transmission mode using victim UEs own C-RNTI.

In an embodiment, delivering the new message block through dedicated RRC signaling comprises implicitly triggering the victim UE for aborting acquisition of legacy system information in successive BCCH modification period 202. The approach is followed if the victim UE identifies change in system information through system information change indication in paging message during the previous BCCH modification period. Alternately, if the change in system information is identified by toggling of systemInfoValueTagfield in acquired new SIB-1 through the new message block and/or if the victim UE is configured with measurement resource restriction pattern by the victim cell then the UE aborts the acquisition of legacy system information in successive BCCH modification period 202. The victim cell (pico cell) delivers the new message block through dedicated RRC signaling protected by ABS of aggressor cell (macro cell) in one or more successive BCCH modification periods.

In an embodiment, the victim UE is explicitly triggered for switching between legacy system information acquisition procedure and dedicated signaling RRC procedure for system information acquisition by sending an explicit indication in UE-specific dedicated RRC message by the victim cell. The victim UE switches to the dedicated RRC signaling procedure during one or more successive BCCH modification periods for a time interval if an explicit indication is set as TRUE. The time interval specifies the explicit indication TRUE period and can be provided in UE-specific dedicated RRC signaling message or can be pre-configured in the victim UE.

In an embodiment, explicit indication may be provided in the serving cell measurement resource restriction pattern configured by the victim cell.

In an embodiment, the victim UE resumes legacy system information acquisition procedure when the victim UE receives the explicit indication set as FALSE or the victim UE is de-configured with serving cell measurement resource restriction pattern.

The method disclosed mandates providing relevant legacy SIB-1 information of target cell in the handover command when the victim UE enters the target cell.

In an embodiment, the victim UE can initiate request for delivery of updated system information using dedicated RRC signaling towards the victim cell; if the victim UE receives system information change indication in paging message or the victim UE is handed over to a target cell or the victim UE receives ETWS notification and CMAS notification.

In an embodiment, the method provides a new notification such as a new notification bit or the like associated with system information change indication in paging message. The new notification indicates the victim UE that the system information change is not relevant for connected mode. The value assigned to the bit by the victim cell enables the victim UE to ignore acquisition of system information or prevent initiation of error handling procedure on failure of acquisition of the system information, FIG. 5 illustrates the flow diagram explaining error handling procedure for failure in acquisition of system information according to embodiments as disclosed herein. As depicted in the flow diagram 500 if the victim UE fails to acquire system information comprising legacy system information and/or updated system information delivered in the new message block by the victim cell then it initiates the error handling procedure. On failure of acquisition of system information, at step 501, the victim UE, if configured, sends system information acquisition failure message in response to initiation of error handling procedure. At step 502, the victim UE checks if it can send system information acquisition failure message to the victim cell. If the victim UE is not configured to send system information acquisition failure message then, at step 503, the victim UE declares Radio Link Failure (RLF). Upon reception of system information acquisition failure message from the victim UE, at step 504, the victim cell resends (re-delivers) the new message block in dedicated RRC signaling (UE-specific). At step 505, the victim UE checks if the new message block is received (successfully acquired) through dedicated signaling within a configurable time. The victim UE acquires the new message block using C-RNTI.

In an embodiment, the configurable time can be the configurable time interval 203 or a new error handling timer defined by the method disclosed or the like.

If the victim UE is unable to acquire the new message block, within the configurable time, the victim UE either declares RLF or re-sends the system information acquisition failure message to the victim cell.

If the UE chooses to resend (re-deliver) the system information acquisition failure message to the victim cell, the error handling procedure of the victim UE loops back to step 501 and continues the process till system information is acquired successfully.

In an embodiment, if the UE victim fails to successfully acquire system information within pre-defined attempts, the UE can declare RLF.

If the victim UE successfully receives (acquires) system information resent by the victim cell in the new message block, within the configurable time, then at step 506, the victim UE continues acquisition of remaining system information blocks such as SIB-2, SIB-3 and so on if required, based on acquired SIB-1. The various actions in flow diagram 500 may be performed in the order presented, in a different order or simultaneously. Further, in some embodiments, some actions listed in FIG. 5 may be omitted.

In an embodiment, the victim UE does not initiate the error handling specified behavior if updated system information acquisition is initiated in response to trigger received for ETWS notification and CMAS notification.

In an embodiment, the error handling procedure comprises allowing the victim UE to send a dedicated system information acquisition failure message to the victim cell using RRC dedicated message, Medium Access Control (MAC) Control Element (MAC CE) or similar message.

In an embodiment, one or more victim UEs initiate the RLF recovery procedure towards a camped cell by including cause value of the RLF in a RLF report generated. The cause value denotes RLF occurred due to system information acquisition failure and victim UE includes the RLF report during the RLF recovery procedure sent to the serving cell of the respective victim UE.

The embodiments disclosed herein can be implemented through at least one software program running on at least one hardware device and performing network management functions to control the elements. The elements shown in FIG. 1 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for delivering system information to at least one User Equipment (UE) in connected mode within a dominant co-channel interference region of a victim cell in a Heterogeneous Network (HetNet) environment, wherein said method comprises:

triggering, by the victim cell, said at least one UE during current Broadcast Control Channel (BCCH) modification period to apply a new signaling procedure for acquiring updated system information; and delivering, by the victim cell, said updated system information in a new message block within a subframe protected by Almost Blank Subframe (ABS) of an aggressor cell, wherein the new message block is delivered during a predetermined time interval from a start position of a second BCCH modification period, which is a successive BCCH modification period after the current BCCH modification period, wherein a UE Identity field in a paging message, a cell specific broadcast indication or the cell specific broadcast indication through at least one UE specific radio resource control (RRC) dedicated signaling is used for the triggering, and wherein the new message block includes a Cell Radio Network Temporary Identifier (C-RNTI) indicating the victim cell.

2. The method as in claim 1, wherein said method further comprises implicitly triggering said at least one UE to apply said new signaling procedure to acquire said updated system information if said at least one UE is configured with at least one measurement resource restriction pattern by said victim cell, wherein said at least one measurement resource restriction pattern is a serving cell restriction pattern.

3. The method as in claim 1, wherein said new message block is at least one of:

a new Master Information Block (new MIB), a new type one System Information Block (new SIB-1), wherein information in said new MIB and said new SIB-1 is similar to legacy system information comprising a legacy MIB and a legacy SIB-1.

4. The method as in claim 1, wherein said method further comprises delivering said new SIB-1 in said new message block, if said at least one UE has Primary broadcast channel (PBCH) interference cancellation capability to acquire said legacy MIB transmitted by said victim cell.

5. The method as in claim 1, wherein delivering said updated system information in said new message block to said at least one UE by said victim cell is performed using one of: targeted broadcasting, dedicated signaling mode of transmission, wherein said new message block delivered through targeted broadcasting is acquired by said at least one UE using a Dedicated System Information Radio Network Temporary Identifier (D-SI-RNTI).

6. The method as in claim 1, wherein said method comprises applying said new signaling procedure to said at least one UE to acquire said new message block within a configurable time interval of at least one successive BCCH modification period, and wherein said configurable time interval is specified with reference to start boundary of said at least one successive BCCH modification period.

7. The method as in claim 1, wherein said method further comprises initiating an error handling procedure to declare a Radio Link Failure (RLF), if said at least one UE fails to acquire at least one of: said legacy system information or said new message block, within one of: said configurable time interval, a new error handling timer, wherein said system information acquisition is not initiated in response to trigger received for at least one of Earthquake and Tsunami Warning System (ETWS) notification and Commercial Mobile Alert System (CMAS) notification.

8. The method as in claim 1, wherein said method further comprises verifying change in said system information by acquiring one of: said legacy SIB-1, said new message block at the boundary of each said successive BCCH modification period and checking if systemInfoValueTag field in an acquired SIB-1 has toggled, further said at least one UE applies acquired SIB-1 and initiates legacy procedure to acquire said updated system information if said systemInfoValueTag field has toggled.

9. The method as in claim 1, wherein said method further comprises delivering said new message block to said at least one UE using said dedicated signaling transmission mode if said at least one UE initiates request for acquisition of said system information update in response to one of: receiving said system information change indication in paging message, handover to a target cell and receiving said at least one of ETWS notification and CMAS notification, further said at least one UE triggers said RLF if said at least one UE fails to acquire said system information in said new message block within at least one of: said configurable time interval, said new error handling timer.

10. The method as in claim 1, wherein said method further comprises providing a new notification associated with system information change indication in paging message to inform said at least one UE to ignore at least one of: acquisition of said system information, initiation of said error handling procedure on failure of acquisition of said system information, wherein said new notification indicates system information change is not relevant for connected mode.

11. A User Equipment (UE) for receiving system information within a dominant co-channel interference region of a victim cell in a Heterogeneous Network (HetNet) environment, wherein said UE comprises:
an integrated circuit further comprising at least one processor;
at least one memory having a computer program code within said circuit;
said at least one memory and said computer program code with said at least one processor cause said UE to:
receive a trigger during current Broadcast Control Channel (BCCH) modification period to apply a new signaling procedure for acquiring updated system information from the victim cell; and
acquire said updated system information which is delivered in a new message block within a subframe protected by Almost Blank Subframe (ABS) of an aggressor cell,
wherein the new message block is acquired during a predetermined time interval from a start position of a second BCCH modification period, which is a successive BCCH modification period after the current BCCH modification period,
wherein a UE Identity field in a paging message, a cell specific broadcast indication or the cell specific broadcast indication through at least one UE specific radio resource control (RRC) dedicated signaling is used as the trigger, and
wherein the new message block includes a Cell Radio Network Temporary Identifier (C-RNTI) indicating the victim cell.

12. The UE as in claim 11,
wherein said UE is further configured to receive said trigger implicitly for applying said new signaling procedure to acquire said updated system information if said UE is configured with at least one measurement resource restriction pattern by said victim cell, and
wherein said at least one measurement resource restriction pattern is a serving cell restriction pattern.

13. The UE as in claim 11,
wherein said new message block received by said UE comprises at least one of: a new Master Information Block (new MIB), a new type one System Information Block (new SIB-1), and
wherein information in said new MIB and said new SIB-1 is similar to legacy system information comprising a legacy MIB and a legacy SIB-1.

14. The UE as in claim 11, wherein said UE is further configured to receive said new SIB-1 in said new message block, if said UE has Primary broadcast channel (PBCH) interference cancellation capability to acquire said legacy MIB transmitted by said victim cell.

15. The UE as in claim 11, wherein said UE is configured to one of:
acquire said new message block using a Dedicated System Information Radio Network Temporary Identifier (D-SI-RNTI), wherein said new message block is delivered by said victim cell through targeted broadcasting.

16. The UE as in claim 11, wherein said UE is further configured to apply said new signaling procedure to acquire said new message block within a configurable time interval of at least one successive BCCH modification period, wherein said configurable time interval is specified with reference to start boundary of said at least one successive BCCH modification period.

17. The UE as in claim 11, wherein said UE is further configured to initiate an error handling procedure to declare a Radio Link Failure (RLF), if said UE fails to acquire at least one of: said legacy system information or said new message block, within one of: said configurable time interval, a new error handling timer, wherein said system information acquisition is not initiated in response to trigger received for at least one of: Earthquake and Tsunami Warning System (ETWS) notification and Commercial Mobile Alert System (CMAS) notification.

18. The UE as in claim 11, wherein said UE is further configured to verify change in said system information by acquiring one of: said legacy SIB-1, said new message block at the boundary of each said successive BCCH modification period and checking if systemInfoValueTag field in an acquired SIB-1 has toggled, further said UE applies said acquired latest SIB-1 and initiates legacy procedure to acquire said updated system information if said systemInfoValueTagfield has toggled.

* * * * *